Sept. 17, 1940.   F. R. HENSEL ET AL   2,215,289
ELECTRODE HOLDER
Filed April 25, 1939
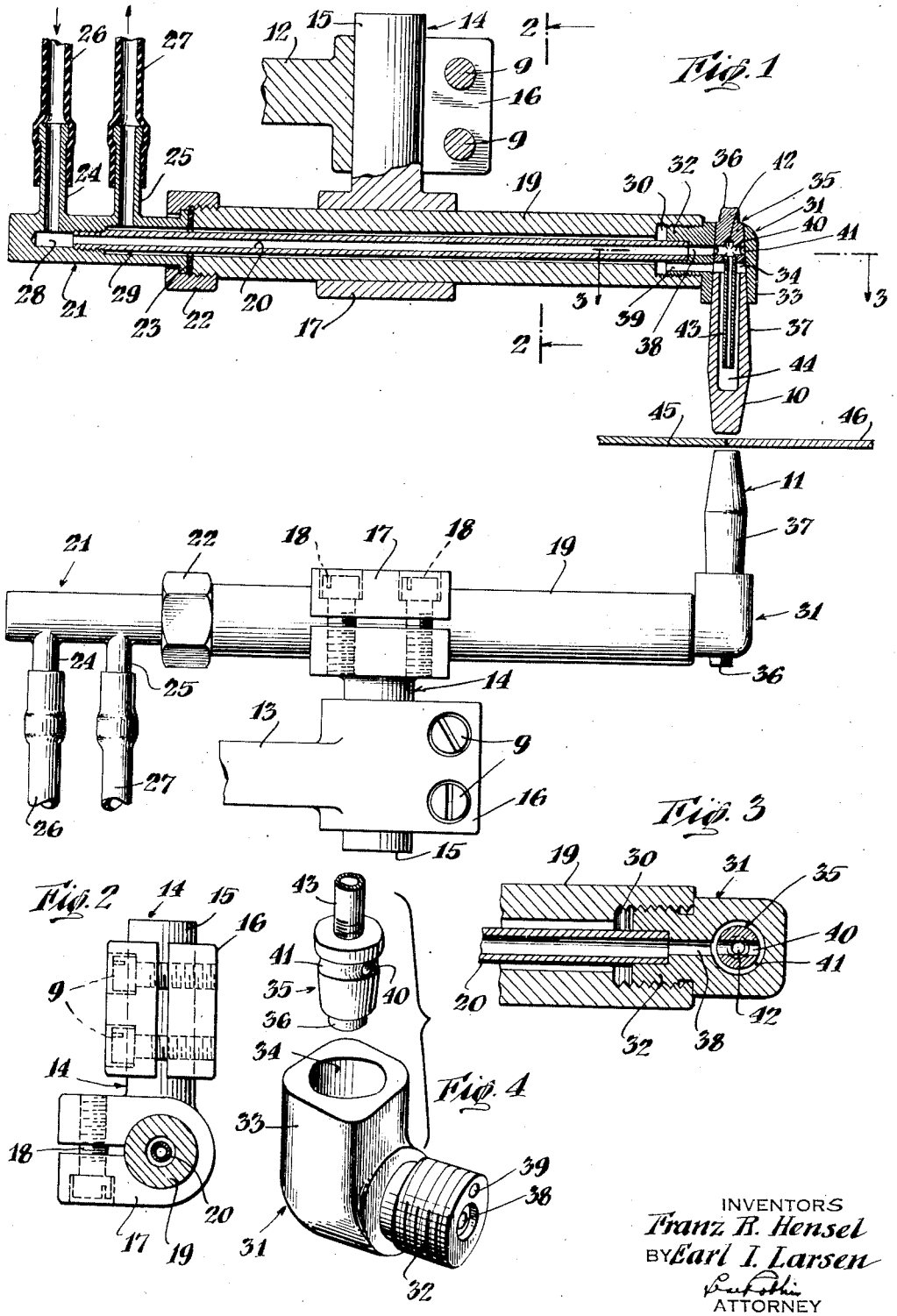
INVENTORS
*Franz R. Hensel*
BY *Earl I. Larsen*
ATTORNEY Patented Sept. 17, 1940

2,215,289

UNITED STATES PATENT OFFICE 2,215,289

ELECTRODE HOLDER

Franz R. Hensel and Earl I. Larsen, Indianapolis, Ind., assignors to P. R. Mallory & Co., Inc., Indianapolis, Ind., a corporation of Delaware Application April 25, 1939, Serial No. 269,836

7 Claims. (Cl. 219—4)

This invention relates to a new and improved electrode holder for resistance welding purposes.

The invention has for its object generally to provide in devices of the character specified, an improved construction and arrangement of parts which is efficient, economical and readily manufactured.

More specifically, an object of the invention is to provide an internally water cooled electrode holder, suitable for performing welding operations at various angles, planes, depths and the like.

Another object of the present invention is to provide an offset holder in which the distance between the electrode and the supporting shank may be varied within rather wide ranges.

It is a further object of the invention to provide an offset electrode holder in which the tip may be swiveled about either its vertical or longitudinal axes.

A still further object is to provide an electrode holder with an adapter for holding the electrode at any desired angle with the barrel of the holder.

It is an additional object of the present invention to provide an offset holder in which the tip can be ejected by means of a simple knock-out plug.

It is a still further object of the invention to provide a universal holder with water cooling of the electrode tip in every possible welding position.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

In the drawing:

Figure 1 is an elevation, partly in section, of a pair of co-operating welding electrodes and the holder and water cooling assemblies therefor, employing features of the present invention;

Figure 2 is a section on the line 2—2 of Figure 1;

Figure 3 is a section on the line 3—3 of Figure 1; and

Figure 4 is an exploded perspective view of the electrode adaptor and ejector plug assembly.

A feature of the present invention resides in an adaptable electrode holder assembly whereby the welding electrode can be adjusted to a variety of positions and angles. In the preferred embodiment, for example, means are provided whereby the electrode may be rotated about an axis parallel with the electrode axis and also about an axis perpendicular to the electrode axis, thus enabling adaptation of the electrode to almost any position and angle within the reach of the holder assembly. The electrode can also be adapted, according to the invention, by a suitable holder, to have any desired angle with the barrel of the holder.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring to the drawing, Figure 1 shows a pair of co-operating resistance welding electrodes 10 and 11 supported in holder assemblies which are clamped to the arms 12 and 13 respectively of a welding machine.

Since the holder assemblies for both electrodes are identical the assembly for electrode 10 only will be described in detail reference being had to Figure 1 for the general assembly and to Figures 2, 3 and 4 for a clearer illustration of some of the details. The holder assembly for electrode 10 comprises a clamping shank 14 comprising a cylindrical rod-like portion 15 which is clamped in the arm 12 of the welding machine by means of a clamp 16 on the end of arm 12, the clamp having a cylindrical bore which can be tightened by screws 9. Clamping shank 14 likewise has an integral clamp 17 at its end, this clamp likewise having a cylindrical bore which can be tightened by screws 18. Clamp 17 is clamped around the barrel 19 of a water-cooled electrode holder. This holder comprises hollow barrel 19 within which is positioned a concentric tube 20 which is screwed into a threaded portion in water-supply head member 21. Water-supply head 21 is clamped to the left-hand end of barrel 19 (as shown in Figure 1) by a threaded sleeve 22, the joint being made water-tight by washer 23 between the barrel 19 and head 21. Head 21 is provided with a pair of integral side tubes 24 and 25 to which are attached water supply and outlet hoses 26 and 27, respectively. Head 21 has suitably bored out passages 28 and 29 therein to convey the water supply to the tube 20 and to provide a water outlet from the barrel 19 to water outlet tube 25.

The other end of barrel 19 is provided with an internally threaded enlarged bore 30 into which is screwed an elbow-shaped adaptor head 31 comprising a threaded shank 32 which is screwed into threaded bore 30 and a short tubular portion 33 integral with the shank and disposed at right angles thereto, the bore 34 of portion 33 being tapered from the free end of portion 33 and extending completely through to the elbow of portion 33.

While an adapter head 31 is shown for purposes of illustration having means for holding the electrode at right angles (90 degrees) with the barrel 19 it is contemplated that other angles may also be provided for, such as 45 degrees, 60 degrees or any other angle with the longitudinal axis of the barrel.

A suitably tapered ejector plug 35 fits into bore 34 and has a short projection or boss 36 extending out of the end of tapered bore 34 at the elbow. Welding electrode 10 has a tapered shank 37 which also fits into tapered bore 34 to provide a water-tight joint.

The threaded shank 32 has a central passage 38, communicating with tapered bore 34 at one end and ending in a socket at the other. The end of tube 20 fits into this socket. Shank 32 also has a second passage 39 parallel to central passage 38 to connect the inside of barrel 19 with the tapered bore 34. Adaptor plug 35 has a transverse passage 40 which registers with passage 38 when adaptor plug 35 is wedged tightly into position in tapered bore 34. An annular groove 41 is also machined around the periphery of ejector plug 35 at this position to provide a free water passage in case passages 40 and 38 are not aligned when the plug 35 is inserted.

An axial passage 42 is drilled in ejector plug 35 from the large end thereof to the junction with transverse passage 40 and a short section of brass tube 43 is screwed into passage 42 and extends down into the hollow interior 44 of welding electrode 10.

The circulation of the cooling water will then be as follows:

The water enters through rubber tube 26 and side tube 24 of the water-supply head, then passes through passage 28 and tube 20 into passage 38 of adaptor 31, then through annular groove 41 and transverse passage 40 of the ejector plug 35 and central passage 42 of the ejector plug and out through brass tube 43 into the hollow interior 44 of electrode 10 thereby cooling the electrode. The waste water then flows back through the hollow 44 of the electrode, passage 39, the bore of barrel 19 surrounding tube 20, side tube 25 of the water-supply head and rubber hose 27.

Thus the welding electrode 10 (and in a similar manner electrode 11) is held in any suitable position for welding and is supplied with cooling water during the welding operation, as for example, the butt welding of sheets 45 and 46 together.

All of the parts when tightly assembled together make water-tight seals. The ejector plug 35 and electrode 10 are wedged tightly within the tapered bore 34 which may, for example, have a taper known in the art as a Morse taper.

Should it be desired to remove electrode 10 this can readily be done merely by tapping or hammering on boss 36 of ejector plug 35. It will be noted that such an action supplies a force to unseat both the ejector plug and the electrode in a direction directly opposite to the seating force. This results in a minimum amount of pressure being required to unseat the tip and also results in avoiding any galling or damage of the taper such as is often encountered with present electrodes where they must be removed by hammering the electrode itself or using a wrench.

It will be noted that the adaptor members and the ejector plug can be made largely or entirely on automatic screw machines and hence are comparatively simple to construct. Furthermore, all parts are interchangeable.

The materials from which these parts are preferably manufactured are heat treatable copper alloys of high strength and high electrical conductivity, preferably having an electrical conductivity of not less than 20% of that of copper and a hardness of not less than 65% Rockwell B. Alloys which are suitable for this purpose are copper base materials which are precipitation hardened by means of intermetallic compounds containing ingredients such as chromium, beryllium and the compounds of the iron group metals such as the silicides, phosphides, aluminides and beryllides. Copper base alloys hardened by means of additions of titanium, zirconium and silver may also be used. Similar alloys are also preferably used in making the barrel 19 of the holder. Where heavy stresses are to be encountered it is also advisable to make the clamping shank of a strong high conductivity heat treatable copper base alloy.

Heretofore it has been the practice to manufacture a separate type of holder for each individual application and, therefore, a comparatively large set of special holders was necessary to accomplish a variety of operations. The present invention overcomes this disadvantage and provides an offset holder which can be adapted to welding in almost any position. This is accomplished by rotating shank 14 about a vertical axis which thereby rotates the entire assembly. The electrode can also be rotated about a horizontal axis by rotating barrel 19 in clamp 17 until the electrode reaches the desired angle after which the assembly is clamped in this position for use.

The present assembly has the added advantage of providing a simple tip ejector by means of which the tip may readily be removed for replacement purposes.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A welding electrode and holder assembly comprising a holder having a tapered socket aperture extending therethrough, a welding electrode having a tapered shank seated in the socket with the tapered surface of the shank seating against the tapered wall of said socket and the head of said electrode projecting from the larger end of said socket, the smaller end of said shank terminating short of the smaller end of said socket, and a tapered knock-out plug separate from said electrode and seated in the small end of said socket aperture with the tapered surface thereof seating against the tapered wall of said socket, the smaller end of said plug projecting from the smaller end of said socket, whereby said electrode may be dislodged from said socket by striking the projecting portion of said knock-out plug.

2. A welding electrode and holder assembly comprising a holder having a tapered socket aperture extending therethrough, a welding electrode having a tapered shank seated in the socket with the tapered surface of the shank seating against the tapered wall of said socket and the head of said electrode projecting from the larger end of said socket, the smaller end of said shank terminating short of the smaller end of said socket, and a tapered knock-out plug separate from said electrode and seated in the small end of said socket aperture with the tapered surface thereof seating against the tapered wall of said socket, the smaller end of said plug projecting from the smaller end of said socket, said holder and plug having registering passages for conveying cooling fluid to the vicinity of said electrode.

3. A welding electrode and holder assembly comprising a holder having a tapered socket aperture extending therethrough, a welding electrode having a tapered shank seated in the socket against the tapered surface of the shank seating against the tapered wall of said socket and the head of said electrode projecting from the larger end of said socket, the smaller end of said shank terminating short of the smaller end of said socket, and a tapered knock-out plug separate from said electrode and seated in the small end of said socket aperture with the tapered surface thereof seating against the tapered wall of said socket, the smaller end of said plug projecting from the smaller end of said socket, said holder and plug having registering passages and said plug having a projecting tube connected with certain of said passages, said electrode having a recess extending longitudinally thereof from the smaller end of its shank, and said projecting tube extending into said electrode recess for conveying cooling fluid to said electrode.

4. A welding electrode and holder assembly comprising a holder having a socket aperture extending therethrough, said aperture having a tapered wall of diminishing diameter extending inwardly from one end, a welding electrode having a tapered shank seated in the socket with the tapered surface of the shank seating against the tapered wall of said socket and the head of said electrode projecting from the larger end of said socket, the smaller end of said shank terminating short of the smaller end of said socket, and a knock-out plug separate from said electrode and seated in the smaller end of said socket aperture, the smaller end of aid socket having seating surfaces restraining said plug against travel out of the smaller end of said socket and cooperating with said plug to form a water-tight seal, a portion of said plug projecting from the smaller end of said socket, whereby said electrode may be dislodged from said socket by striking the projecting portion of said knock-out plug.

5. A welding electrode and holder assembly comprising a holder having a socket aperture extending therethrough, said aperture having a tapered wall of diminishing diameter extending inwardly from one end, a welding electrode having a tapered shank seated in the socket with the tapered surface of the shank seating against the tapered wall of said socket and the head of said electrode projecting from the larger end of said socket, the smaller end of said shank terminating short of the smaller end of said socket, and a knock-out plug separate from said electrode and seated in the smaller end of said socket aperture, the smaller end of said socket having seating surfaces restraining said plug against travel out of the smaller end of said socket and cooperating with said plug to form a water-tight seal, a portion of said plug projecting from the smaller end of said socket, whereby said electrode may be dislodged from said socket by striking the projecting portion of said knock-out plug, said holder and plug having registering passages for conveying fluid to the vicinity of said electrode.

6. A welding electrode and holder assembly comprising a holder having a socket aperture extending therethrough, said aperture having a tapered wall of diminishing diameter extending inwardly from one end, a welding electrode having a tapered shank seated in the socket with the tapered surface of the shank seating against the tapered wall of said socket and the head of said electrode projecting from the larger end of said socket, the smaller end of said shank terminating short of the smaller end of said socket, and a knock-out plug separate from said electrode and seated in the smaller end of said socket aperture, the smaller end of said socket having seating surfaces restraining said plug against travel out of the smaller end of said socket and cooperating with said plug to form a water-tight seal, a portion of said plug projecting from the smaller end of said socket, whereby said electrode may be dislodged from said socket by striking the projecting portion of said knock-out plug, said holder and plug having registering passages and said plug having a projecting tube connecting with certain of said passages, said electrode having a recess extending longitudinally thereof from the smaller end of its hank, and said projecting tube extending into said electrode recess for conveying cooling fluid to said electrode.

7. A welding electrode and holder assembly comprising a holder having a socket aperture extending therethrough, said aperture having a tapered wall of diminishing diameter extending inward from the larger end, a welding electrode having a tapered shank seated in the socket with the tapered surface of the hank seating against the tapered wall of said socket and the head of said electrode projecting from the larger end of said socket, the smaller end of said shank terminating short of the smaller end of said socket aperture, and a knock-out plug separate from said electrode and seated in the smaller end of said socket aperture, said plug having a larger diameter inner end within said aperture and a smaller diameter outer end projecting out of the smaller end of said socket aperture, the smaller end of said socket aperture being of smaller diameter than the inner end of said plug whereby said plug is retained therein but is capable of movement toward the larger end of said socket aperture and into abutment with the inner end of said welding electrode, said plug normally sealing said smaller end of said socket aperture against water leakage.

FRANZ R. HENSEL.
EARL I. LARSEN.